US005366135A

United States Patent [19]

Tanaka et al.

[11] Patent Number: 5,366,135

[45] **Date of Patent: * Nov. 22, 1994**

[54] METHOD OF MAKING COMPOSITE ELECTRICAL CONTACT

[75] Inventors: Seiichi Tanaka, Tokyo; Shigeru Tabei, Machida, both of Japan

[73] Assignee: Chugai Denki Kogyo K.K., Japan

[ * ] Notice: The portion of the term of this patent subsequent to Dec. 7, 2010 has been disclaimed.

[21] Appl. No.: 92,611

[22] Filed: Jul. 16, 1993

Related U.S. Application Data

[63] Continuation-in-part of Ser. No. 952,570, Sep. 28, 1992, Pat. No. 5,268,237.

[30] Foreign Application Priority Data

Oct. 28, 1991 [JP] Japan .................................. 3-347579

[51] Int. Cl.5 .............................................. B23K 20/00

[52] U.S. Cl. ................................ 228/116; 228/262.6; 427/125; 29/885

[58] Field of Search ..................... 228/115, 116, 262.6; 29/885; 427/125

[56] References Cited

U.S. PATENT DOCUMENTS

| | | | |
|---|---|---|---|
| 3,519,543 | 7/1970 | Gwyn, Jr. | 29/885 |
| 3,600,794 | 8/1971 | Shibata et al. | 228/115 |
| 4,446,618 | 5/1984 | Bollian | 228/115 |
| 4,559,703 | 12/1985 | Gagas | 427/125 |
| 5,268,237 | 12/1993 | Tanaka et al. | 428/673 |

OTHER PUBLICATIONS

*IBM Tech. Discl.*, vol. 20, No. 10 (Mar. 1978) p. 4254.

*Primary Examiner*—P. Austin Bradley
*Assistant Examiner*—Jeffrey T. Knapp
*Attorney, Agent, or Firm*—Shlesinger Fitzsimmons Shlesinger

[57] ABSTRACT

A method for making a bimetallic or trimetallic electrical contact. Features that only its shank portion, made of copper or copper alloy, is covered by a thin layer of silver or silver alloy for protecting the shank portion from environmental erosion. This shank portion is made by cutting the silver-plated wire to a short piece.

2 Claims, 1 Drawing Sheet

METHOD OF MAKING COMPOSITE ELECTRICAL CONTACT

RELATED APPLICATION

This application is a continuation-in-part of our copending application Ser. No. 07/952,570, filed Sep. 28, 1992, now U.S. Pat. No. 5,268,237.

BACKGROUND OF THE INVENTION

A composite electrical contact such as a rivet-shaped bimetallic contact which is composed of a metallic contact or head portion and a shank portion made of a metal different from the metal of the contact portion and bonded to a bottom surface of the contact portion, is used by fixing it to a support plate by clinching a free end of the copper or copper alloy shank portion against the support plate. The composite electrical contact such as a bimetallic or trimetallic electrical contact thus caulked to a hole of the support base plate is mounted in an electrical appliance for making various electrical control operations such as opening and closing electric circuits.

The contact or head portion of the composite electrical contact of the kind mentioned above is generally made of a silver alloy, in silver matrices of which particles of metal oxides such as tin oxides are precipitated, so that it can stand up well to a high temperature caused by electric arcs generated about the contact portion when the contact is switched on and off.

The shank portion bonded to a bottom surface of such thermal resistant head portion is made of a metal having a high electric conductivity such as copper and copper alloys, so that electric currents can flow efficiently to and from the head portion. The shank portion can contribute also to dissipate the heat generated at the head portion, and is easy to be caulked to a support plate which is also made of copper or copper alloys.

After the shank portion is passed through a hole provided to the support plate and having a diameter nearly equal to the diameter of the shank portion, its free end is clinched and caulked to the support plate.

This caulking is not so easy if it has to ensure hermetical bonding completely between the shank portion and the support plate. That is, it is nearly impossible to bond them completely airtightly so that there will be not left any gap between the circumference of the shank portion and the hole and between the clinched free end of the shank portion and the support plate.

When the contact caulked to the support plate is operated, its temperature rises, especially at the gap. And, when the shank portion of the contact is subjected to air at an elevated temperature, copper of the shank portion exposed to the gap between it and the support plate becomes oxidized in a short period of time. The electrical conductivity of the shank portion which forms green rust on account of oxidation lowers, and the electrical conductivity and heat dissipation characteristics of the contact as a whole lower consequently, resulting in that the temperature of the contact rises rapidly and the contact will be welded.

In view of the above, this invention is to provide a method of making a novel composite electrical contact, shank portion of which shall be free from a green rust when it is caulked to a support plate and even when subjected to a severe switching operation.

BRIEF SUMMARY OF THE INVENTION

In the composite electrical contact made in accordance with the method of this invention, only the shank portion of the composite contact, which is made of copper or copper alloys, is covered by a thin layer of silver or silver alloys.

Composite contacts are often stored in the air for a comparatively long period of time until they are mounted to electrical appliances after they are manufactured. In such case, conventional contacts, especially exposed copper shank portions thereof become oxidized noticeably. In order to prevent such oxidation, such contacts as a whole normally are dipped into a bath of molten silver so that the entire outer surfaces of the contacts are plated by silver. This known way of plating results, however, in covering not only the shank portions but also the contact portions. When the contact portions which are made of a high refractory material, are covered by silver, their refractoriness is lost. The contact portions will be welded soon.

DETAILED DESCRIPTION OF THE INVENTION

EXAMPLE

A wire of 2.5 mm in diameter made of Ag—Sn 8%-In 4%-Ni 0.1% alloy which had been internal-oxidized, was cut to form a short piece. This short piece was employed as a material for making the contact portion or head 1 of the contact shown in FIG. 1.

On the other hand, to prepare the shank portion 2, a wire of a pure copper surrounded at its outer circumferential surface by a silver layer 3, which had been plated at a thickness of 70$\mu$, was employed. This plated wire was hot-rolled to have a diameter of 2.5 mm, including the thin layer 3, and was sheared or cut to form a short piece of the type shown in FIG. 2.

Figure 1:
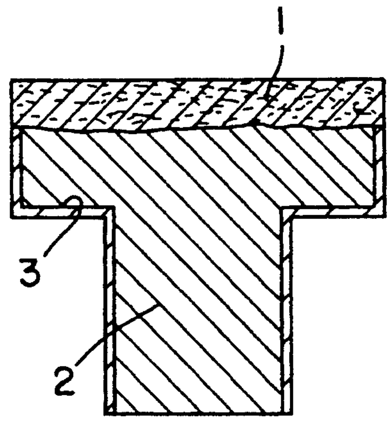
FIG. 1 is an enlarged cross-sectional view of the bimetallic electrical contact made in accordance with this invention.

Said silver-tin internal-oxidized alloy cut wire, and said silver plated copper cut wire were aligned coaxially and directly cold bonded under pressure, immediately after they were cut or sheared to form the cut wires. The two cut wires thus directly bonded together were shaped to a rivet-shaped bimetallic electrical contact having a configuration and dimensions as shown in FIG. 1. This contact (FIG. 1) is called hereinafter the Contact (A).

Figure 2:
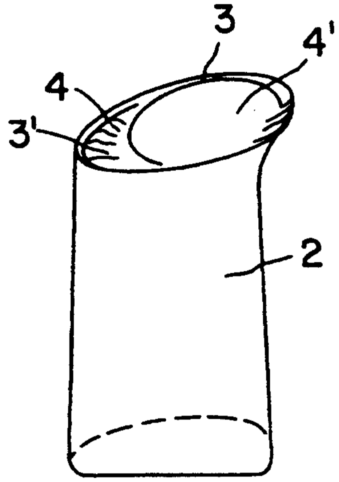
FIG. 2 is an explanatory perspective view showing a short copper wire piece with a circumferential thin plated layer of silver, which will be a shank portion when it is bonded to a contact portion, the wire piece having been sheared to have a fresh and active surface to be bonded to the contact portion.

As shown in FIG. 2, before being cold bonded to the silver-tin oxide cut wire, the upper surface of the silver plated copper short wire 2 had, as shown in FIG. 2, a cut or sheared surface 4 and a fractured surface 4'. And, onto the cut surface 4, a part 3' of the circumferential silver layer 3 appears to have flowed. This silver portion 3' increased the activity of the cut surface 4 for bonding the two cut wires.

For the sake of comparison with the contact (A), a Contact (B) was made by employing a copper cut wire (without the plated silver layer 3) as its shank portion. A third Contact (C) was made by dipping the Contact (B) type into a molten silver bath. This Contact (C) thus had both its contact and shank portions completely plated by silver of 7μ in thickness.

The Contacts (A), (B), and (C) were respectively revetted to copper supports plates. Under the following conditions, their initial contact resistances were tested by a ASTM-50 testing machine as shown in the Table 1, while temperatures of them measured at terminals with the support plates after 1,000 switching on and off were as shown in the Table 2.

Conditions for Initial Contact Resistance:
Contact force 400 g; Electric current DC6V, 1A
Conditions for Temperature Raise:
Load AC200V, 50A
Reactor pf=0.23; Frequency 60 switching/minute

TABLE 1

| | initial contact resistance (mΩ) |
|---|---|
| Contact (A) | 0.8-2.1 |
| Contact (B) | 1.2-2.3 |
| Contact (C) | 0.7-2.1 |

TABLE 2

| | Temperature (°C.) |
|---|---|
| Contact (A) | 25.6 |
| Contact (B) | 44.3 |
| Contact (C) | testing was stopped as the contact was welded. |

As shown in the above test results, the contact made in accordance with this invention is excellent in that its temperature after a number of switching operations is extremely low showing that its shank portion had not suffered from oxidized erosion and subsequent increase of electrical resistance, and that consequently the shank portion had functioned well to dissipate heat from the contact portion to the support plate.

In this invention, since the shank portion is made of a short wire cut from a copper wire plated at its outer surface with silver, contacts having only copper shank portion thereof covered by silver can be made efficiently and economically on an industrial scale.

With respect to physical properties, there are following advantages too, in this invention.

(1) While it is most important in the production of bimetallic contacts to make their bonded surfaces firm and strong, the bonded surfaces which connect the contact and shank portions are most stable and reliable in this invention. In conventional methods for manufacturing bimetallic contacts by the employment of shank portions which are produced by shearing a copper wire, copper oxides on outer surfaces of the copper wire tend to flow onto sheared surfaces of copper short pieces for the shank portions, resulting in adversely affecting their bonding with the contact portions of silver or silver alloys. Such drawbacks or phenomena are absolutely prevented in this invention, since the copper wires employed are effectively protected at their outer surfaces by silver which prevents inner copper from being oxidized.

(2) Bimetallic contact which have been bonded and shaped by heading to have a desired contact configuration are subjected finally to a cleaning step in which the contacts are forced to abut and polish each other in a rotating barrel, whereby their contact portions are rubbed by copper of the shank portions, and whereby their contact surfaces are consequently tainted microscopically by copper debris.

The bimetallic contact made in accordance with this invention is almost free from such phenomena, because as mentioned above, their copper shank portions are covered by silver.

(3) In case of conventional bimetallic contacts, copper will adhere onto contact surfaces and spoil them, as the contact surface of a contact will inevitably come into abutment with the copper shank portion of another contact when they are stored in bulk or when they are fed successively in bulk for automatically rivetting them to contact supporting plates. Copper particles or debris adhered or sticked to the contact surfaces are oxidized by electric arcs or ageing, resulting in raising contact resistances or inducing weldings.

With respect to electrical properties too, there are following advantages in this invention.

(1) As the test results show, the contacts made in accordance with this invention have a low electrical resistance and a low temperature raise.

The above advantageous features can hardly be expected of conventional bimetallic composite contacts having exposed copper shank portions, because the copper shank portions are equivalently provided with filmy oxidized surfaces in a thickness of the order of Angstrom (Å) even when they are thoroughly cleaned. Such filmy oxidized surfaces make a composite resistance unstable and much different, depending on how much degree the copper shank portions are rivetted to the supporting plates. On the other hand, in this contact, its resistance is extremely stable as mentioned above, on account of its copper shank portions being covered with filmy silver which prevents the shank portions from being oxidized. While it is known that copper is oxidized very rapidly when it is heated to above 80° C., such adverse oxidation is avoided in this contact, primarily because its copper portion does not expose outside and additionally because its temperature rising in low.

(2) The bimetallic contacts made in accordance with this invention have small contact consumption and excellent anti-welding characteristics.

The above features are prerequisite to electrical contacts. It can safely be said that those not having these features would not be worth as electrical contacts. One of factors for achieving the above features is to provide contacts with good electrical as well as thermal conductivities, while they will be also dependent on materials of which the contacts are made. The contact of this invention is well provided with excellent electrical and thermal conductivities. That is, the excellent conductivities are attained by silver films which cover a shank portion of the contact and through which heat produced at a contact portion is effectively transferred to and dispersed in a supporting plate, whereby temperature rising is suppressed low.

(3) Anti-corrosion characteristics are also excellent in this invention.

Especially when contacts are used in a direct current circuit, their switching operations often produce an acid gas by their electrolytic reactions with the moisture of the air.

On account of such gas, copper shank portions easily gather rust which will cause a corrosion and malfunction of the contacts. The contact made in accordance with this invention is free from such corrosion and malfunction, since its shank portion is protected by silver.

It will be noted that although an original silver layer plated over the shank portion was 70μ in thickness in the example, the thickness could be a few μ or less in accordance with the application and environment for and in which the contact is employed. And, said silver layer could be replaced by one made of A1, Ni, Pb, Zn, Sn, Ti, Pt, Pd, Rh, V, Ru, or their alloys. And, the shank portion could be made of copper alloys. And, although in the example, a bimetallic contact is described, a trimetallic contact can be made also in accordance with this invention.

By utilizing for the shank portions of the contacts pieces of coated wire which are sheared at opposite ends thereof from a coated wire, a number of practical advantages flow from the invention. For example:

(1) Production costs are kept low, since it is not necessary to silverplate the contacts piece by piece. Moreover, neither masking nor sheathing is required, differently from a prior method such as disclosed in Mooradian U.S. Pat. No. 3,562,467 in which a metal wire forming a rivet shank is applied with a solder layer only after it has been welded to a rivet head and prior to being deformed to a rivet-like shape.

(2) Silver is saved, since the bottom surface of each shank portion is not coated or silverplated.

(3) Trimetallic double faced contacts can be readily made, since the piece of wire defining the shank of a contact has copper exposed at each end thereof.

(4) In an automatic rivetting operation of contacts, the heads thereof can be readily aligned, since the silver colored heads, vs. bronze or copper-colored lower ends of the shanks can be readily distinguished by color sensing devices.

(5) As noted in the above-mentioned Mooradian patent (column 3, lines 2 and 3) silver sometimes flows downwardly. With this invention, however, the absence of any silver layer at the bottom of a respective contact eliminates the possibility of the silver dropping downwardly onto mechanical or electrical members of appliances in which the contacts are housed

We claim:

1. Method of making a composite electrical contact having a head portion of a silver alloy, and a shank portion of copper or copper alloy being directly cold bonded to one end of said head portion and being completely coated with a protective metallic thin layer between its opposite ends;

which comprises cutting a silver alloy wire to form a short piece of wire for the head portion, and cutting a copper or copper alloy wire coated with the protective metallic thin layer to form a short piece of wire cut at opposite ends thereof for the shank portion, aligning the short piece of wire for the head portion and the shank portion so that said shank portion is juxtaposed to said head portion, and directly cold bonding said short piece of wire under pressure.

2. Method as claimed in claim 1, in which the protective metallic thin layer is made of a metal selected from the group consisting of Ag, Al, Ni, Pb, Zn, Sn, Ti, Pt, Pd, Rh, V, Ru and alloys thereof.

* * * * *